United States Patent Office 3,302,723
Patented Feb. 7, 1967

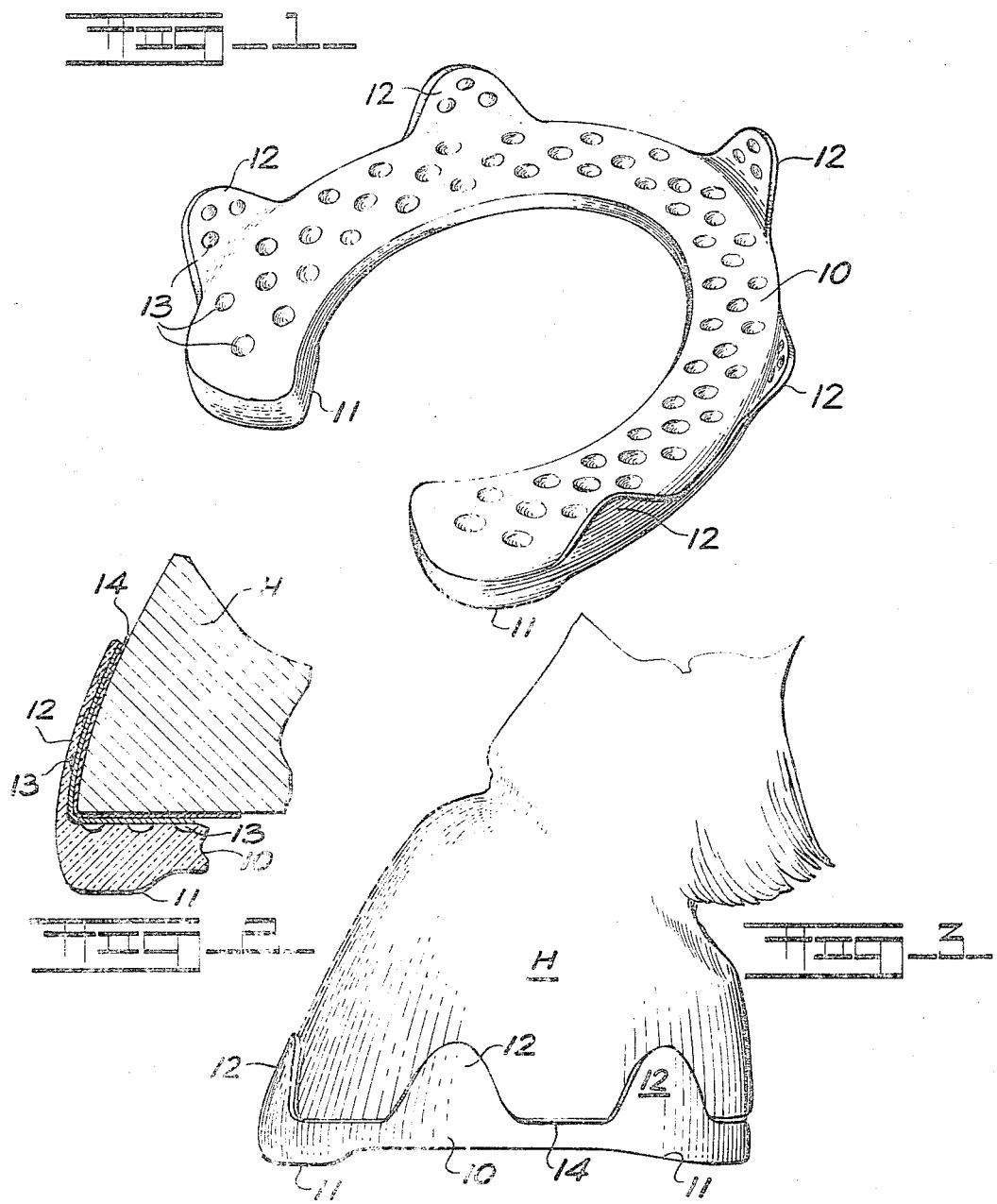

3,302,723
NAILLESS HORSE SHOES
Darrell L. Renkenberger, Berlin Center, Ohio 44610, and Harold G. Brown, Ellsworth, Ohio 44416
Filed Sept. 9, 1965, Ser. No. 486,055
2 Claims. (Cl. 168—4)

This invention relates to nailless horse shoes and more particularly to a nailless horse shoe arranged to be affixed to the horse's hoof by an adhesive.

The principal object of the invention is the provision of a horse shoe of a configuration contributing to the use of contact cements and the like in securing the horse shoe to the horse's hoof.

A further object of the invention is the provision of a horse shoe formed of suitable material selected with respect to desirable wearing quality and ability to hold its desired shape as well as to facilitate the application of the shoe to the horse's hoof and its retention thereon by an adhesive.

A still further object of the invention is the provision of a horse shoe that may be made in several desired sizes and shapes from suitable material and incorporates a conventional bottom configuration and a plurality of upturned integral tabs shaped to resiliently engage the horse's hoof so as to secure the shoe thereto during the time the adhesive positioned between the hoof and the horse shoe is setting.

The nailless horse shoe disclosed herein relates to an improvement in the horse shoeing art and particularly with respect to the elimination of the disadvantages that normally are present when a horse shoe is nailed to the hoof as is customary. Those skilled in the art will recognize that the horse grows a complete hoof every year and that as the hoof grows it changes in shape and contour and that it is therefore necessary to change the shoes frequently. For example, a saddle horse has its shoes changed approximately every three months, while a racehorse would have its shoes changed at approximately six-week intervals.

The heretofore common practice of nailing the horse shoes to the hoof frequently results in cracking the hoof and very frequently results in enlarging and multiplying and splitting the nail holes. This in turn results in injury to the sensitive part of the horse's foot.

It will also be appreciated that the truncated cone of the hoof, which has its base downward, constantly increases in circumference, so that in time the shoe becomes too small and a source of pain to the horse and must therefore be removed and replaced.

When it is remembered that every time a horse is shod it implies damage to the foot, and that the best and most expert shoeing of necessity inflicts some injury, the importance of this matter to the horse's owner is evident.

The present invention solves these difficulties by providing a nailless horse shoe of a design that enables it to be applied to the properly conditioned hoof with a suitable adhesive such as an epoxy resin or a contact cement as known in the art, so that the shoe is held by the adhesive and it is therefore unnecessary to drive nails into the hoof or otherwise subject it to the damage heretofore thought necessary in connection with applying horse shoes.

The nailless horse shoe of the present invention is applied as in the case of conventional shoes used by first properly preparing the hoof by trimming the edges and rasping it down to fit the shoe. The shoe is then applied with its upturned tabs in proper position after the application of the desired adhesive and the tabs hold the shoe in position during the setting of the adhesive or cement, as the case may be, so that the shoe is thus properly fitted and attached to the hoof.

With the foregoing and other objects in view which will appear as the description proceeds, the invention resides in the combination and arrangement of parts and in the details of construction hereinafter described and claimed, it being the intention to cover all changes and modifications of the example of the invention herein chosen for the purpose of the disclosure, which do not constitute departures from the spirit and scope of the invention.

The invention is illustrated in the accompanying drawing, wherein:

FIGURE 1 is a perspective view of a nailless horse shoe and comprises a view taken from the top and rear of the shoe.

FIGURE 2 is an enlarged cross sectional detail through the shoe, the adhesive and the portion of the hoof to which the shoe is applied.

FIGURE 3 is a side elevation of a portion of the horse's hoof and leg showing the nailless horse shoe in position thereon.

By referring to the drawings in FIGURE 1 in particular, it will be seen that the nailless horse shoe comprises a horse shoe shaped body member 10 of suitable thickness and incorporating cleats 11 on the lower surface thereof as customary in the art and provided with a plurality of spaced upturned tabs 12 which are also inturned relative to the horse shoe so that they fit on the truncated cone shape of the hoof in an oppositely disposed clamping or holding action which is sufficient to hold the horse shoe in position while the adhesive used in attaching it to the hoof sets. The upper surface of the horse shoe 10 and the inner surface of the tabs 12 may be and preferably is provided with the plurality of small desirably shaped cavities 13 into which the adhesive material employed will readily flow.

By referring to FIGURE 2 of the drawings, a section of a hoof H is shown and a portion of the horse shoe 10 is illustrated with one of the tabs 12 and two layers of contact cement 14 positioned between the horse shoe and the hoof H. Those skilled in the art will recognize that in applying the nailless horse shoe disclosed herein, it is necessary that the hoof be properly shaped and conditioned as by rasping the same to provide a proper and desirably shaped surface. One layer of the adhesive when the same is a contact cement, such as indicated at 14 in FIGURE 2 of the drawings is then applied to the hoof. A second layer of the contact cement 14 is applied to the horse shoe 10 as to flow into the cavities 13 heretofore described. The shoe is then positioned on the hoof H as shown in FIGURES 2 and 3 of the drawings so that the upturned and inturned tabs 12 clampingly engage the outer conical shape of the hoof as best shown in FIGURES 2 and 3 of the drawings.

The resiliency of the material from which the nailless horse shoe is formed makes this clamping action possible as the shape of the hoof H is such that the upper portions of the tabs 12 are positioned in a circumferential pattern of smaller diameter or size than the outer lower portion of the shoe 10. The self-holding action of the horse shoe 10 as occasioned by the upturned and inturned oppositely disposed tabs 12, thus, accurately positions the shoe on the horse's hoof H and holds it during the time necessary for the complete setting of or curing of the cement 14 or adhesive employed. The setting or curing time of the cement or adhesive 14 may obviously be controlled by the formulation of the particular cement employed. In the case of epoxy resins which are used only as an example, the setting time can be as little as two or three minutes or as long as an hour and in the case of various contact cement such as are readily commercially available, the setting time may be as little as one minute or less.

In either case the formation of the nailless horse shoe with the tabs 12 insures its proper retention and location on the hoof until the adhesive has set and bonded the horse shoe to the hoof.

When it is necessary to reshoe the horse, the horse shoe may be removed by mechanically breaking the adhesive bond or achieving this object through the use of solvent for the particular adhesive employed or alternately grinding off the shoe with a mechanical grinding action. Any of these procedures will successfully remove the shoe without harming the hoof, and the hoof is then reconditioned and shaped and another shoe applied as customary.

It will thus be seen that a nailless horse shoe has been disclosed which is secured to the horse's hoof without injury thereto through the use of a suitable adhesive cement or the like, and having thus described our invention what we claim is:

1. A horse shoe made of resilient material having a curved upper surface adapted to receive a horse's hoof, resilient tab means formed integrally with the resilient material and projecting upwardly and adapted to clampingly engage an outer surface of a horse's hoof and position the horse shoe on the hoof, the upper surface of the horse shoe and the engaging surface of the tab means receiving a bonding means and being provided with a plurality of cavities for receiving the bonding means, said bonding means including a contact cement that is applied to an under surface of a horse's hoof and to the surfaces of the horse shoe, whereby the bringing together of the said hoof and the said horse shoe provides adhesive engagement therebetween while the cavities provide spaced areas of increased thickness of said contact cement.

2. The combination of a horse's hoof and a horse shoe therefore as set forth in claim 1 and wherein said tabs are arranged on said horse shoe so as to engage the exterior surfaces of said hoof in oppositely disposed relation whereby the shoe is held on said hoof by said tabs while said contact cement sets.

References Cited by the Examiner
UNITED STATES PATENTS

| | | | |
|---|---|---|---|
| 144,833 | 11/1873 | Cooke | 168—4 |
| 496,760 | 5/1893 | Tracy | 168—24 |
| 1,116,326 | 11/1914 | Powlowski et al. | 168—20 |
| 3,050,133 | 8/1962 | Ketner et al. | 168—4 |

SAMUEL KOREN, *Primary Examiner.*

HUGH R. CHAMBLEE *Examiner.*